INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

TRACTION DEVICE
Filed May 29, 1959 12 Sheets-Sheet 3

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS

INVENTORS
WILLARD T. PATRICK
HAROLD R. PATRICK
BY
KENWAY, JENNEY, WITTER & HILDRETH
ATTORNEYS 2,998,043
TRACTION DEVICE
Willard T. Patrick and Harold R. Patrick, both of 26 Stoner Ave., Great Neck, Long Island, N.Y.
Filed May 29, 1959, Ser. No. 816,896
26 Claims. (Cl. 152—220)

This invention relates to traction equipment for vehicles of various types, particularly rubber tired vehicles having dual wheel assemblies such as trucks, trailers, tractors and the like.

In the operation of heavy duty vehicles such as trucks it may frequently become necessary for the truck to leave paved highways and pass over undeveloped terrain. Should the vehicle become bogged down a set of chains normally would have to be fitted over the tires before progress could be continued.

Moving vans, dump trucks and mechanized cement mixers are typical of the sort of vehicle that must operate over smooth highways and rough or muddy ground in the normal course of operation. Many other rubber tired vehicles frequently encounter ice, snow, etc. and are often fitted with chains or crawler tracks to increase traction.

The problems of securing a set of chains to a tire are well known to those who have driven in snowy climates for the task is difficult and uncomfortable at best and often becomes frustrating. The chores of fitting a crawler track to a set of truck tires are similar to those of fitting tire chains but greatly compounded because of the increased weight and size of the track. Although crawler tracks are suitable where continuous operation on rough terrain is expected, their use for short periods is impractical in view of their expense and difficulty of installation.

The traction device which is the subject of this invention may be generally described as individual, full-floating pads or shoes arranged to span two adjacent tires mounted on a dual wheel assembly. The shoe covers a portion of each tire tread and is held in position against the tread face by a flexible connecting device passing between the tire and anchored to an annular band or spacer mounted between or about the wheels. Guide members are fitted to the shoe to orient the shoe properly and to prevent it from skewing as the vehicle maneuvers. One or a number of these devices may be spaced about the tires according to the amount of traction required by the prevailing conditions.

This device is of particular advantage in situations where additional traction is needed for short periods of time, since it is quickly and easily installed and may be conveniently stored on the vehicle when not in use. The cost is low and adjustable in keeping with operational needs.

The device is designed to give a full-floating effect by flexing with the tires as they rotate and compress under load. This device is also readily detachable and may be easily adjusted to conform to various tire sizes and, in event that one should break loose, traction would be reduced by one unit and not completely lost as happens with chains or crawler tracks when a link breaks.

The invention is described in greater detail with reference to the drawings in which its objects, features and advantages will be fully appreciated. Reference is made to the drawings in which.

Figure 17:
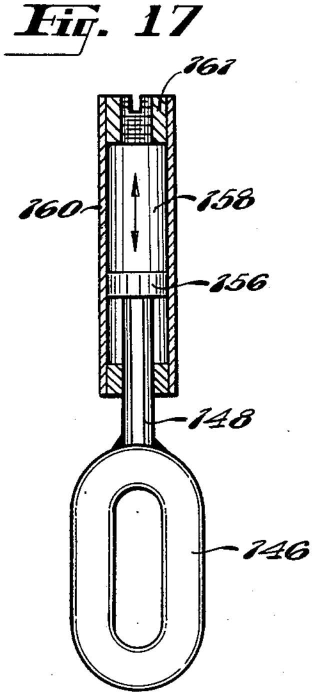
Figure 25:
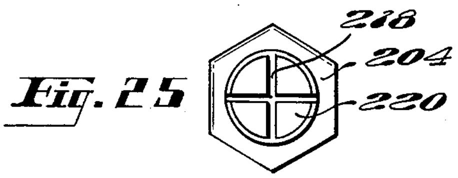
Figures 9, 23, 27:
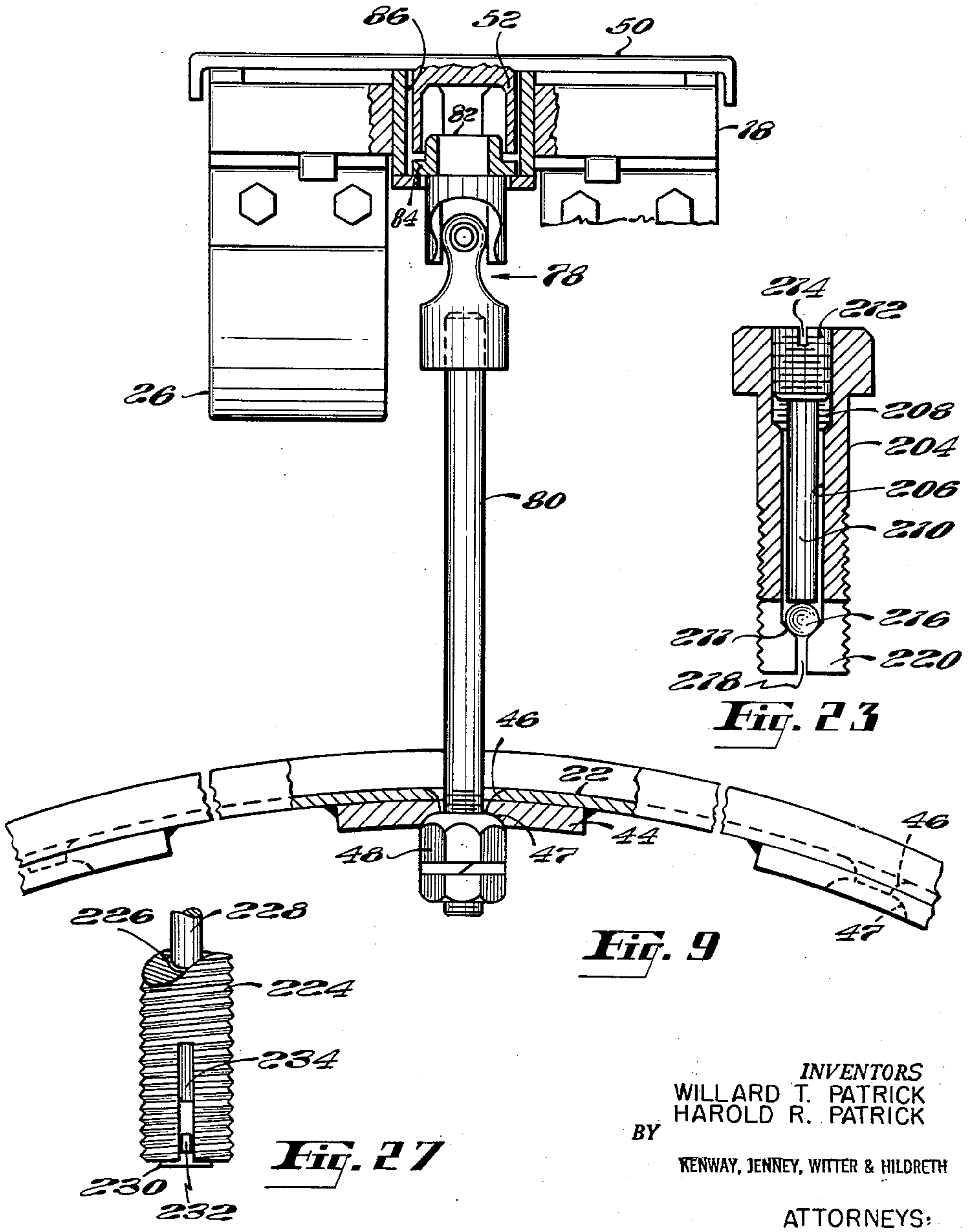
FIG. 9 is a view in side elevation partly in section of another modification of our device.
Figures 10, 11, 12, 24:
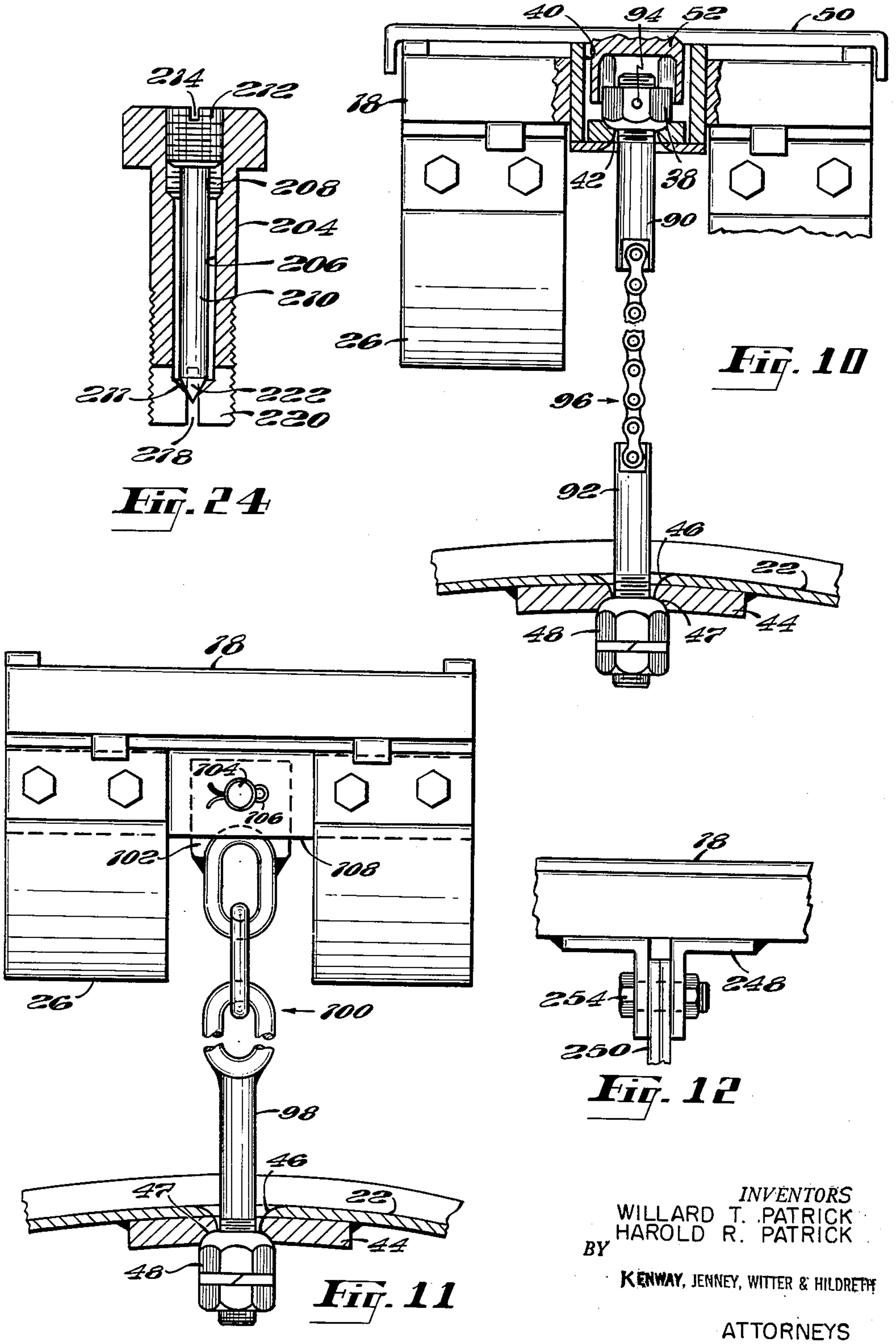
FIGS. 10 and 11 are similar views of two additional modifications.
FIG. 12 is a detail view in end elevation of the device shown in FIG. 11.
Figures 13, 14, 15, 16:
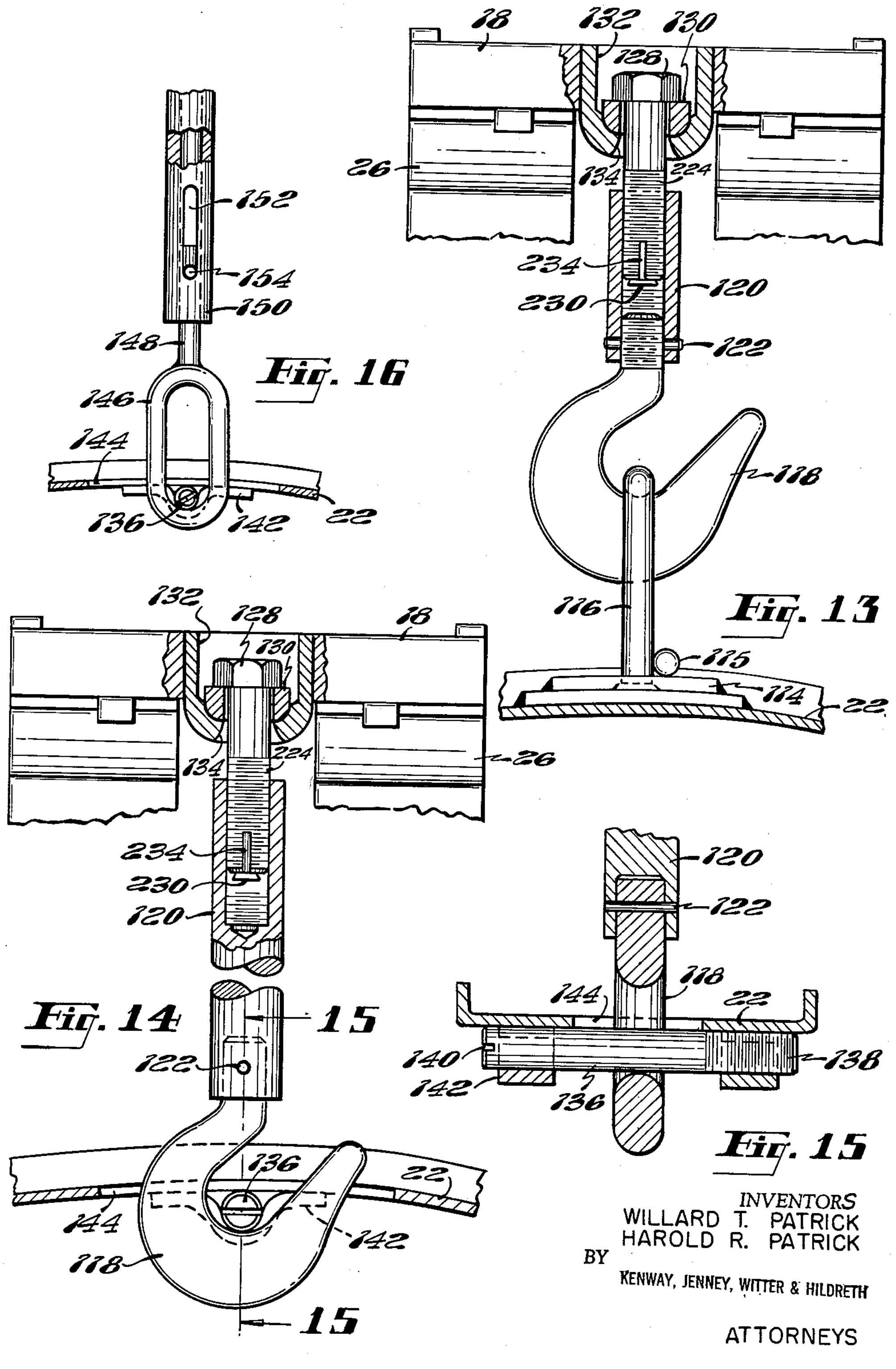
Figures 18, 19, 20, 26:
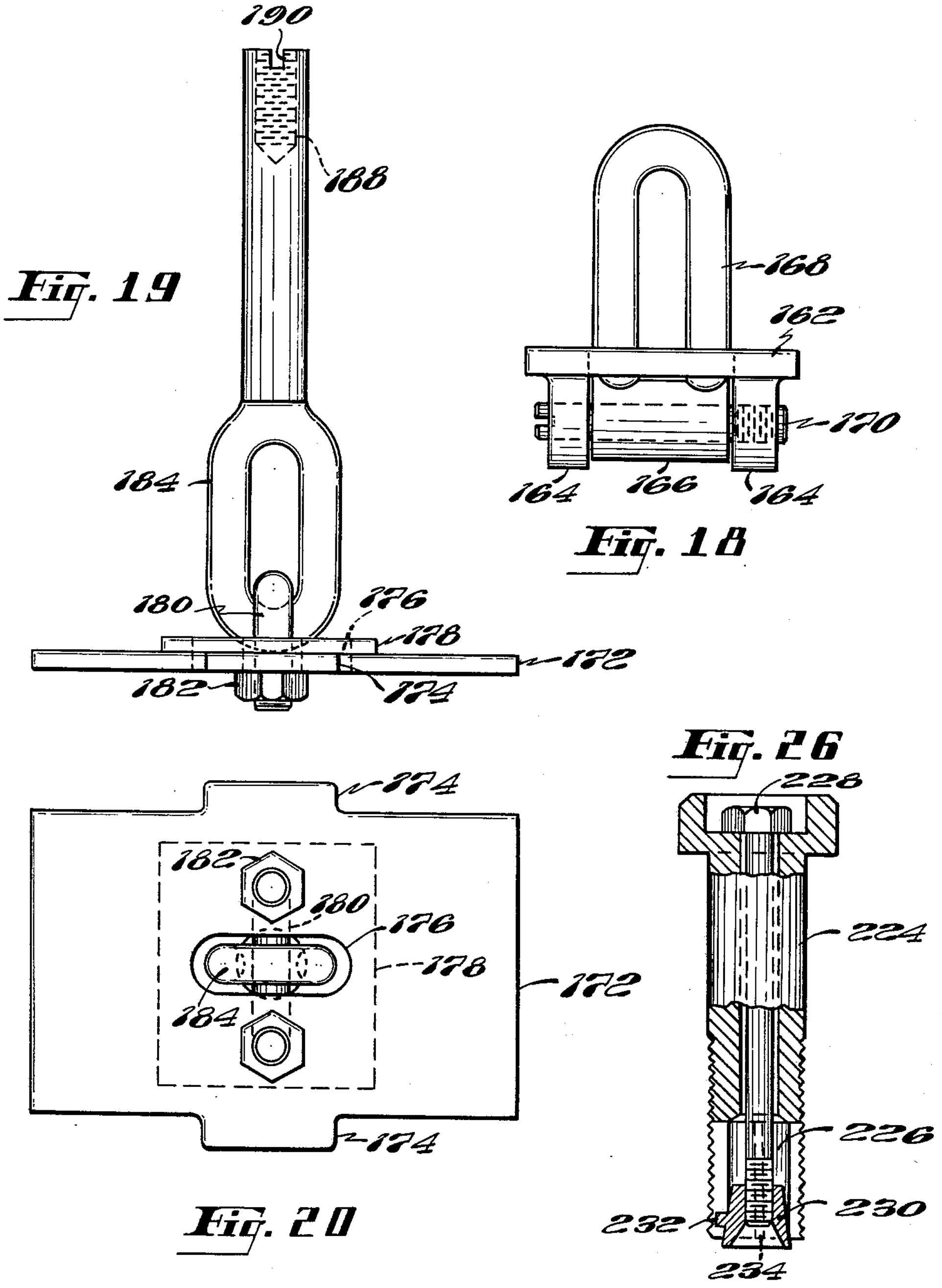
Figures 21, 22, 28, 29, 30:
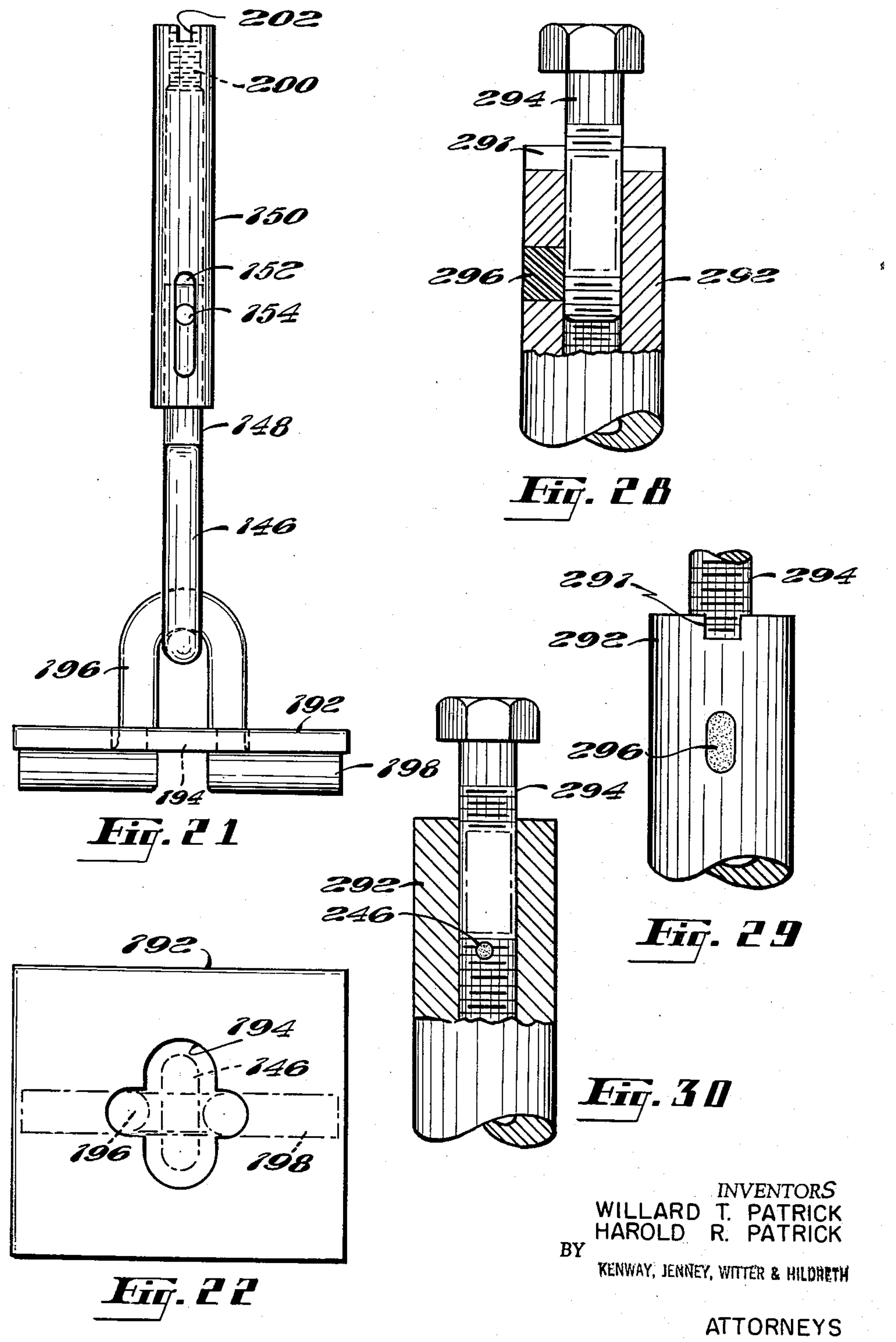
Figures 31, 35:
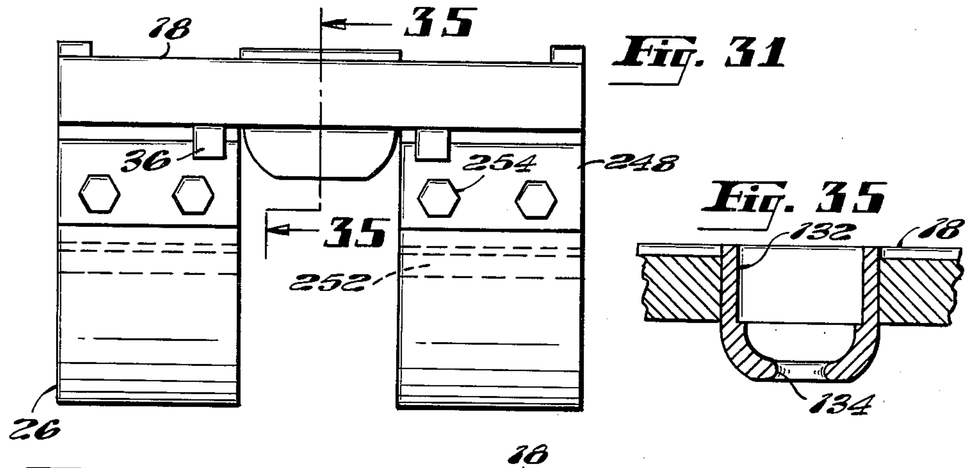
Figures 32, 33, 34:
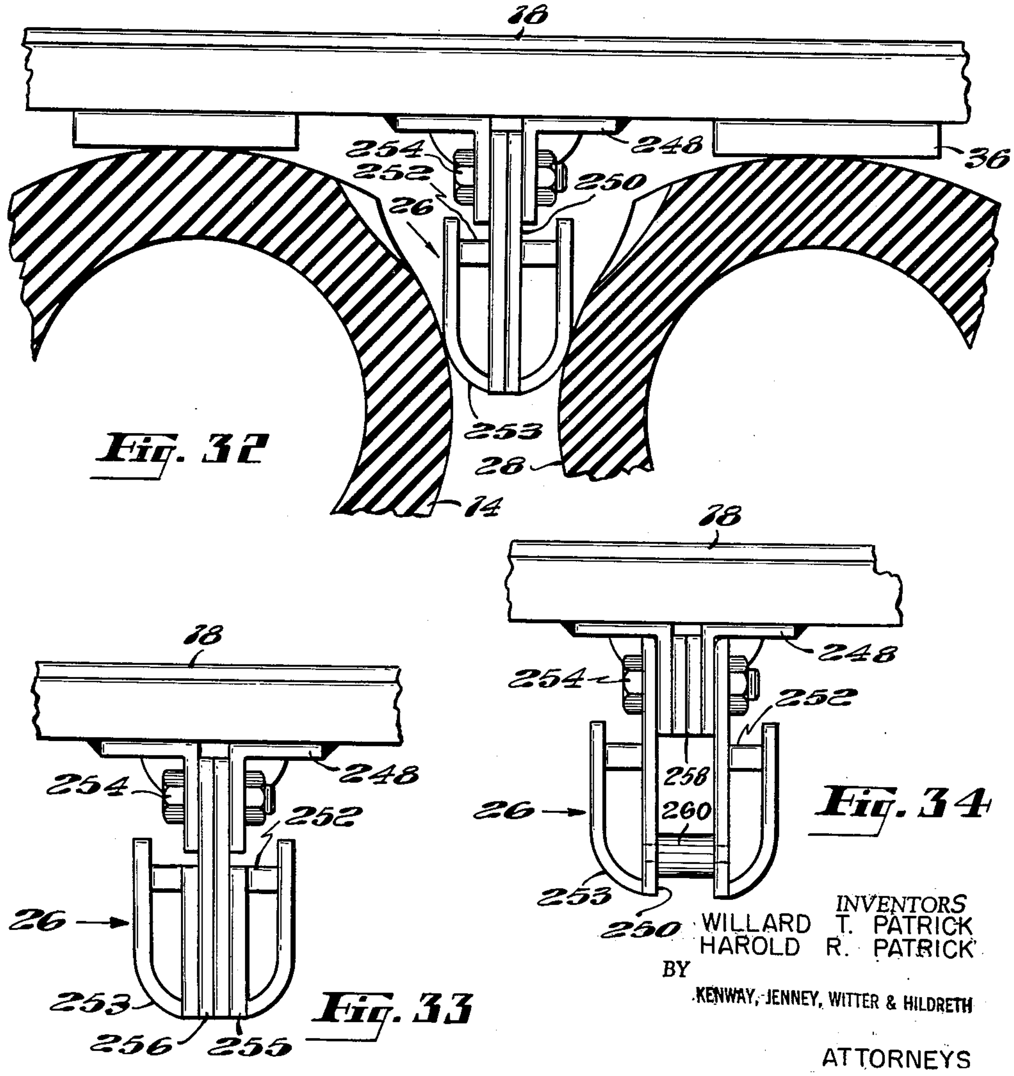
Figures 36, 37, 38:
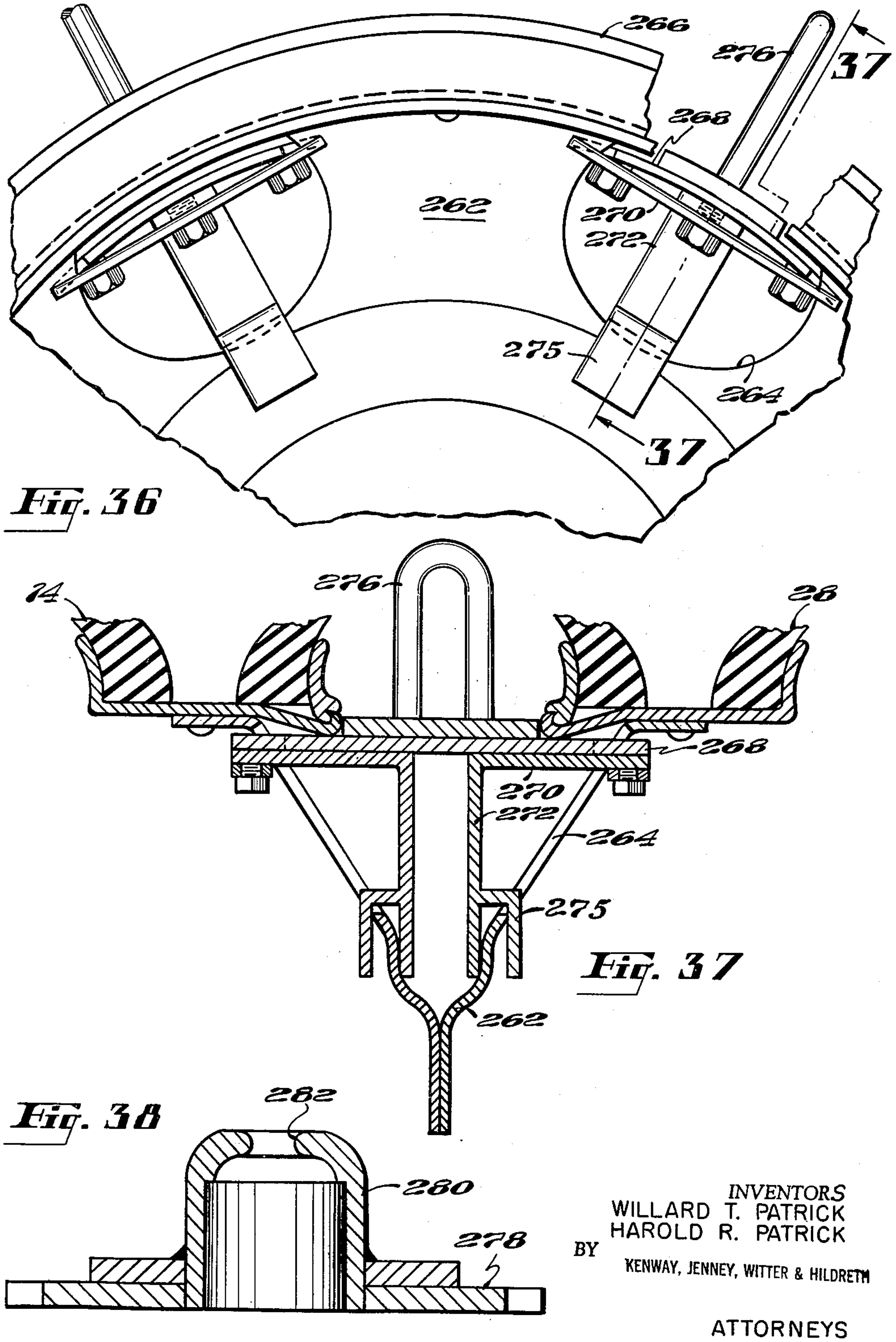
Figures 39, 43:
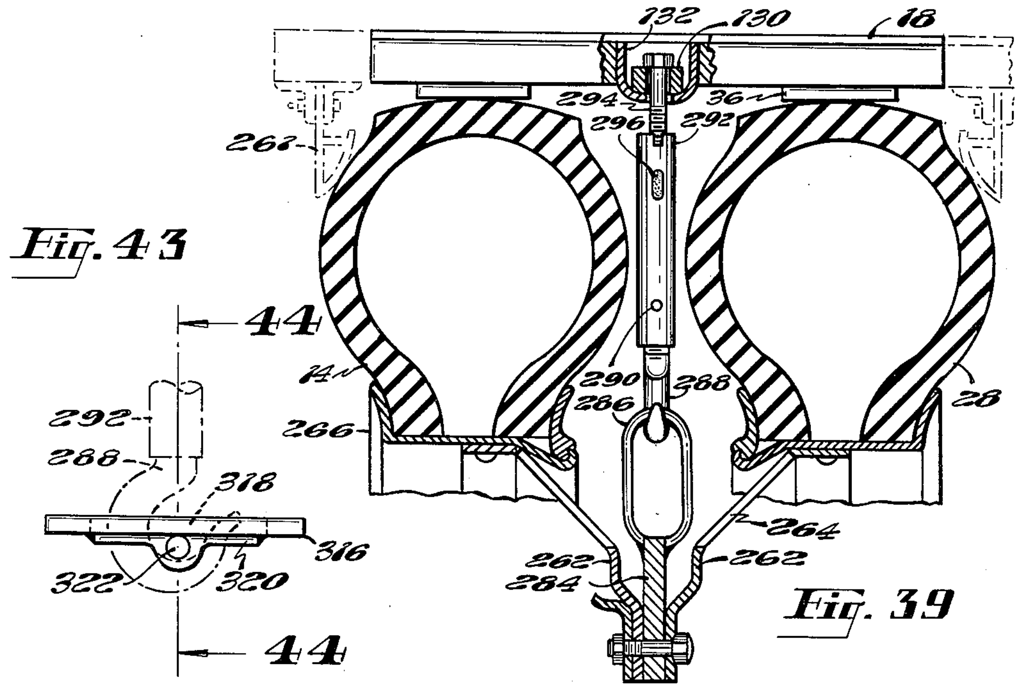
Figures 40, 44:
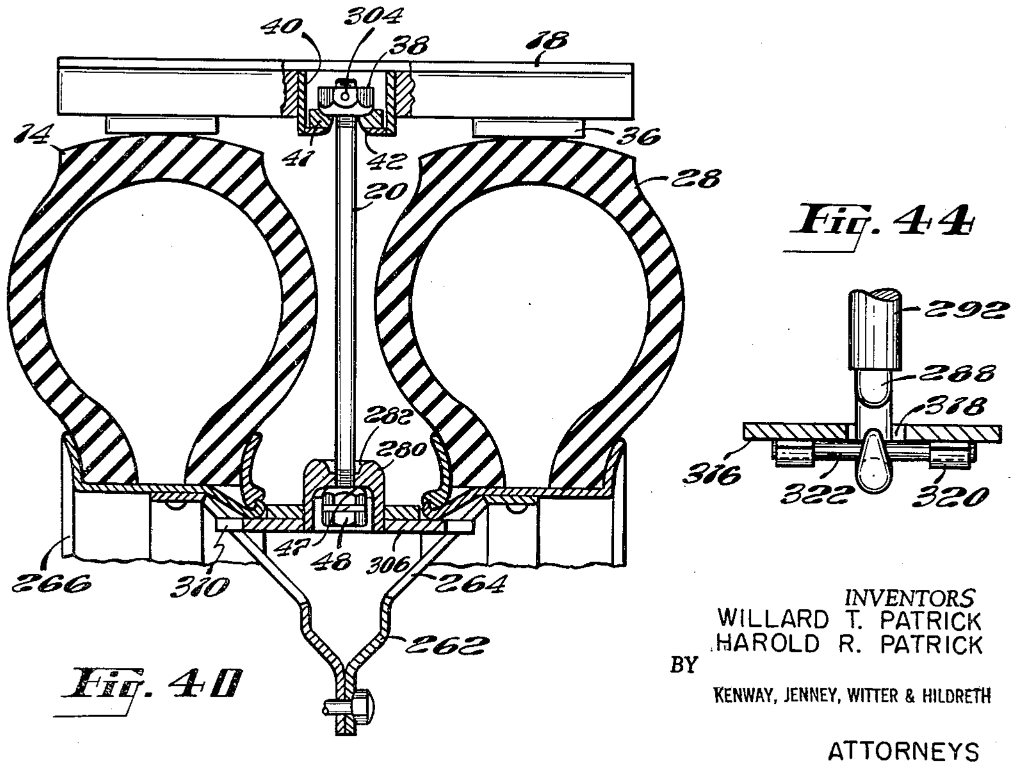
Figure 41:
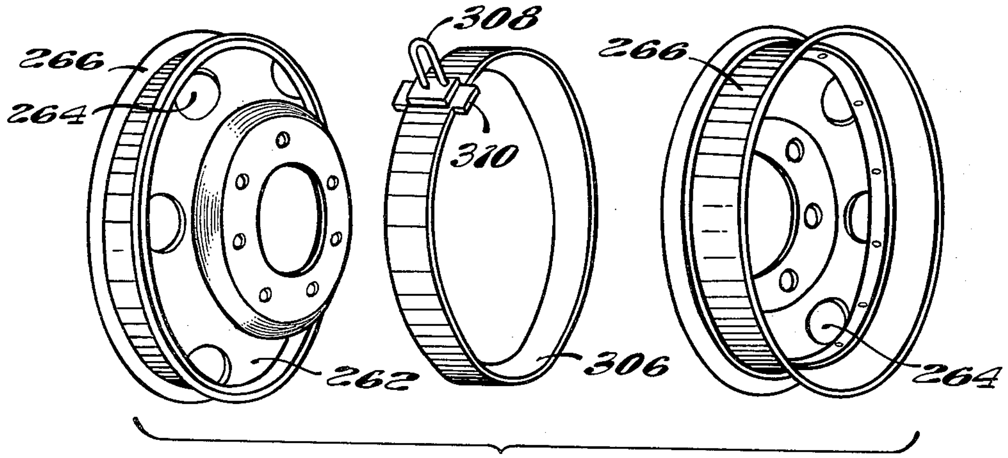
Figure 42:
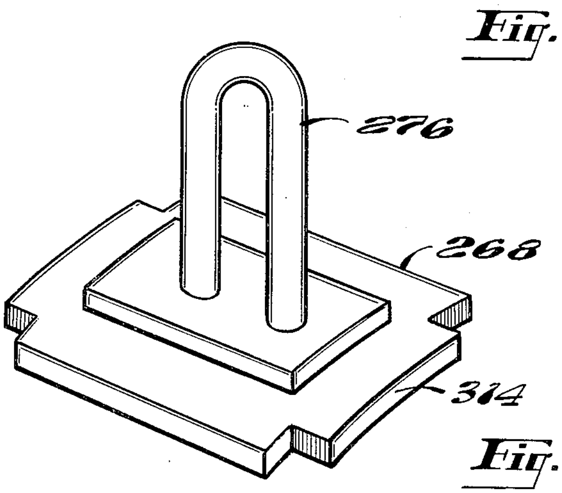

FIGS. 13 and 14 are views in side elevation partly in section of two further modifications, FIG. 15 is a cross section taken along the line 15—15 of FIG. 14, FIGS. 16 and 17 are views in side elevation partly in section of a novel eye-type connecting device that may be used in our invention, FIG. 18 is a view in end elevation of a base plate assembly that may be used to anchor a traction pad, FIG. 19 is a view in side elevation of a base plate assembly with an eye-type connector, FIG. 20 is a plan view of the combination shown in FIG. 19, FIG. 21 is a view similar to that of FIG. 19 of a modification of the connecting and anchoring device, FIG. 22 is a plan view of the combination shown in FIG. 21, FIG. 23 is a cross-sectional view in elevation of a novel expansion bolt that may be used to secure a traction pad to a connector, FIG. 24 is a similar view of a modification of the expansion bolt, FIG. 25 is a bottom plan view of the bolt shown in FIG. 24, FIG. 26 is a view in side elevation partly in section of yet another type of expansion bolt that may be used, FIG. 27 is a detail view partly in section of the bolt shown in FIG. 26, FIGS. 28, 29 and 30 are detail views of connecting members utilizing nylon inserts, FIG. 31 is a view in side elevation of a traction pad and its guides, FIG. 32 is a view in end elevation partly in section showing the pad and guide assembled on a set of tires, FIGS. 33 and 34 are views similar to FIG. 32 but showing on slightly enlarged scale the guide member in various adjusted sizes, FIG. 35 is a cross section taken along the line 35—35 of FIG. 31, FIG. 36 is a view in side elevation of a disk wheel assembly provided with individual anchor supports and a portion broken away to disclose details of construction, FIG. 37 is a cross section taken along the line 37—37 of FIG. 36, FIG. 38 is a cross sectional view in elevation of a modification of the device shown in FIG. 37, FIGS. 39 and 40 are views in end elevation partly in section of a disk wheel assembly showing different means for securing traction shoes thereto, FIG. 41 is a view in perspective of an exploded disk wheel assembly, FIG. 42 is a view in perspective of an individual anchoring piece for use in disk wheel assemblies, FIG. 43 is a view in side elevation of a modified anchoring device, and FIG. 44 is a cross sectional view taken along the line 44—44 of FIG. 43.

This invention is intended for use on dual wheels and, in general, it may be said that there are two basic types of dual wheel assemblies, one being known in the trade as the spoke type wheel and the other being known as the disk type wheel. Examples of the spoke type wheel appear in FIGS. 1 and 3 with the disk type wheel being illustrated in FIGS. 36, 37 and 39 to 41.

The spoke wheel may be roughly described as a hub formed with radially extending spokes usually six in number. The tire rims are slipped over the extremities of the spokes which are provided at their ends with wide, arcuate faces to seat the rims and with an annular spacer between the rims to maintain clearance between the tires mounted thereon. A shoulder extends about the inner portion of the spoke faces, and bolted cleats or clamps are provided on the outer portion of the spoke to keep the assembly intact.

In the case of the disk wheel assembly a pair of dished wheels are bolted together back to back and no spacer is required since the rims are permanently mounted on the wheels in properly spaced relation.

In the description of our invention we will illustrate traction devices which may be used with either the spoke type wheel or disk type wheel or with both. Many of the connections are interchangeable and other parts may be freely substituted as will be obvious from a study of the invention.

Figure 1:
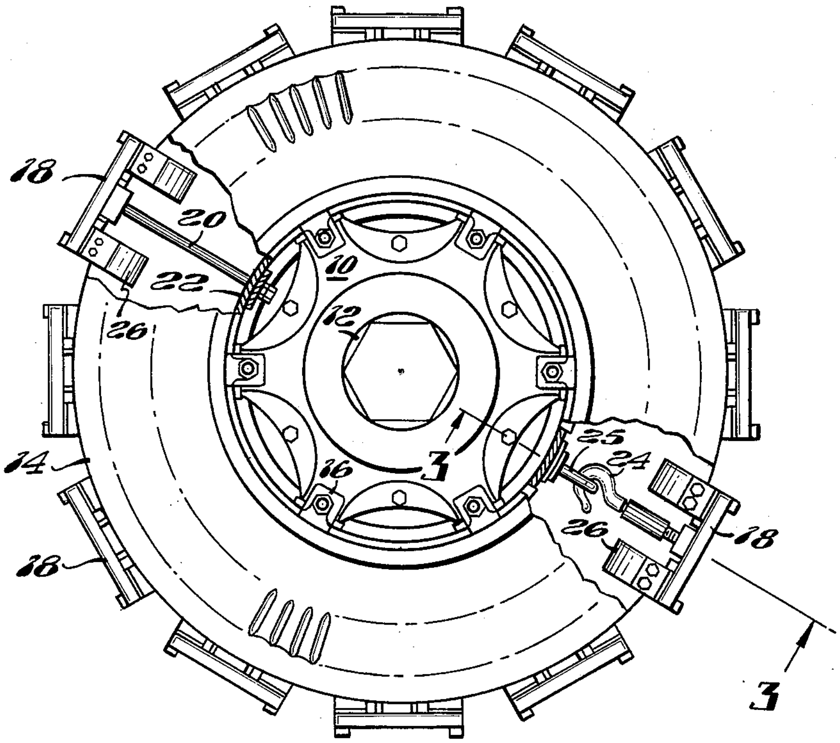
FIG. 1 is a view in elevation partly in section of a dual tire spoke wheel assembly fitted with two types of traction pads made in accordance with our invention.
Figure 3:
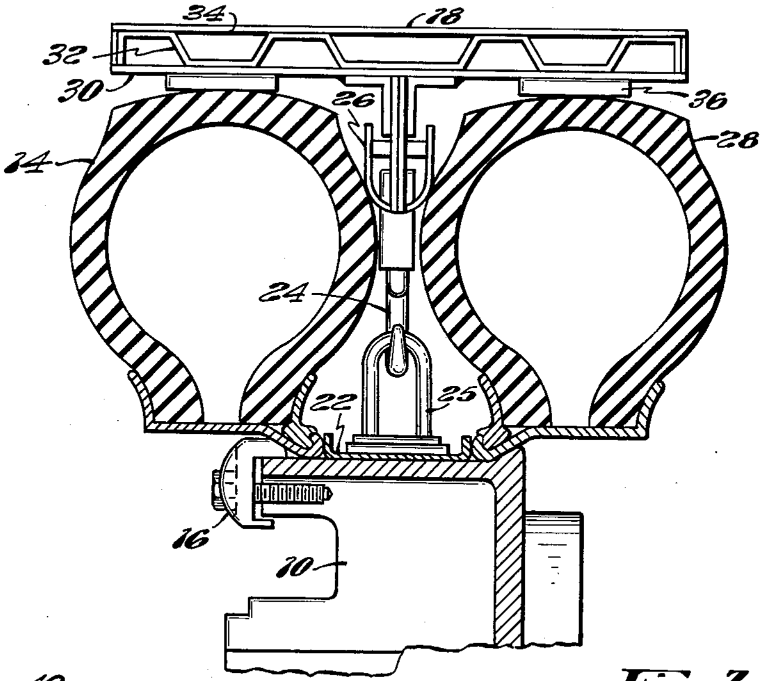
FIG. 3 is a cross-sectional view taken along the line 3—3 of FIG. 1.

Referring now to FIGS. 1 and 3, a spoke wheel assembly 10 is fitted to an axle 12 with a pair of rim-mounted tires 14 and 28 secured in place. A clamp 16 at the extremity of each spoke holds the rims and tires in place over the wheel 10. A spacer 22, which is an annular band with outwardly turned edges, is mounted on the wheel 10 and between the rims of the two tires to maintain flexing space between the side walls of the tires.

Spanning the two tires and bearing against the treads is a traction pad or shoe 18 of suitable material such as steel and takes the form of a corrugated member 32 secured to a lower plate 30 and an upper plate 34 to which grousers may be attached for additional traction. To prevent slippage and to reduce chafing, friction members or cleats 36 are fitted on the inner side of the traction pad to engage the tread face of the tire.

Depending from the traction pad 18 are a pair of guides 26 which extend inwardly between the tires to contact the side walls in the area near the tread so as not to interfere unduly with the normal compression and flexing of the tires. These guides 26 serve to orient the traction pad and prevent it from twisting or skewing which the pad might otherwise have a tendency to do during turning maneuvers of the vehicle. Other features of the guide will be discussed more fully in the course of the description.

To secure the traction pad 18 to the wheel and against the tires we have provided a connecting arrangement that is extremely practical in that it may be used for a variety of different size tires as well as being easily adaptable for use with disk wheels. One of the important features of this connecting arrangement as well as with the others that we will describe, is that it allows what we call a full-floating action of the traction pad. By this we mean that the pad can move with the tires in any manner whatever without coming loose from the tire. The pad is free to ride in and out radially or deflect in any direction when the tire loads are unequal such as occurs when passing over logs, etc., or even when one of the tires deflates.

The cutaway portions of FIG. 1 disclose two different connecting arrangements, one being a rather simple connecting rod 20 and the other being a hook 24 engaging an eye 25. In either event the spacer 22 is used to anchor the connectors to the wheel.

When the hook connection is used the eye 25 is welded to the spacer and the hook is provided with a threaded shank passing through the traction pad and secured by a nut (not shown). This permits the shank length to be adjusted from the outside by a socket wrench or the like. The use of the welded eye and hook also allows a greater number of traction shoes to be used than is possible with the rod type connectors, since the pad eye does not pass through the spacer and does not interfere with the spokes as is the case with the rod.

In the case of the rod type connector the rod 20 is threaded at both ends and passes through both the spacer and the traction pad. The upper or outer end has a balled nut 38 received in a well 40 formed in the traction pad. At the base of the socket is disposed a bushing 41 formed with a ball seat to cooperate with the nut 38 to form a movable ball joint. It will be seen in FIG. 4 that the opening through the bushing 41 is countersunk as at 42 and thus, along with the ball joint, permits the traction pad to freely tilt as well as to move up and down the rod which itself is able to tilt. The inner end of the rod passes through the spacer 22 and a reinforcing block 44, and is provided with a ball and lock nut 48. The block 44 is formed with a ball seat 47 in the same manner as the bushing 41 and also the opening is countersunk at 46 in like fashion. This connecting arrangement provides a stout anchor for the pad yet offers a high degree of motion and flexibility without straining or deformation of parts.

Figure 2:
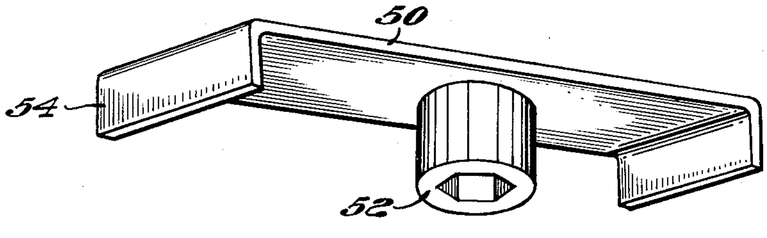
FIG. 2 is a view in perspective of a tool used in adjusting the length of a radial connector used in our invention.

Length and tightness can be easily adjusted from the inner end or the outer end of the rod, but we prefer to tighten it at the inner end by turning the nut 48. Access to this nut is had by the space between the spokes which obviously limits the number of pads to the number of spoke openings. To keep the upper nut 38 from turning while the nut 48 is rotated we have devised a special wrench 50 shown separately in FIG. 2 and in position in FIG. 4. The wrench has a multi-faced socket 52 which fits into the well 40 and over the nut 38. The flat portion overlays the pad and a pair of depending flanges 54 engage the sides of the pad to prevent it from turning and obviating the need of holding the wrench while the nut is being tightened.

Figure 6:
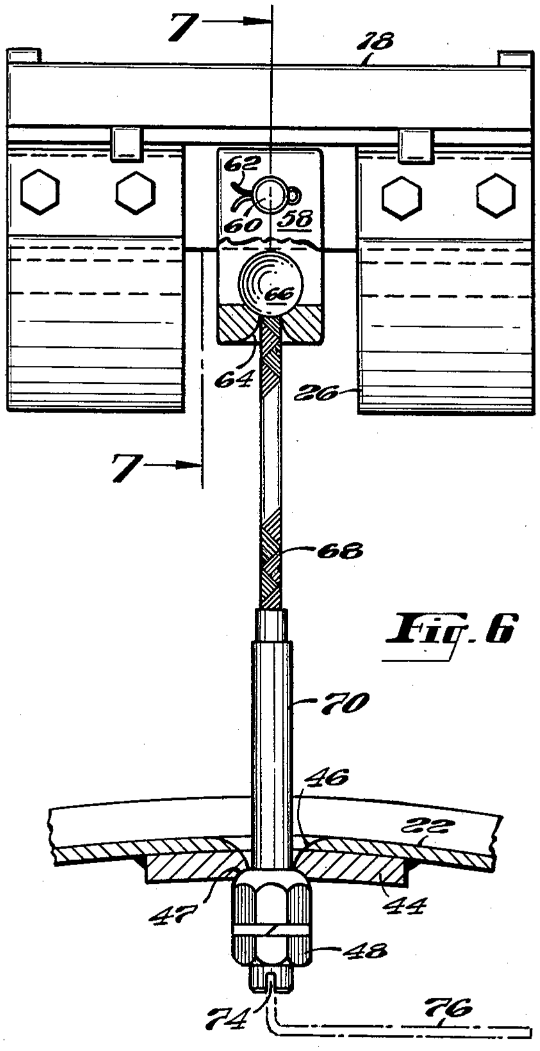
FIG. 6 is a view in side elevation partly in section of a modification of our device.
Figure 7:
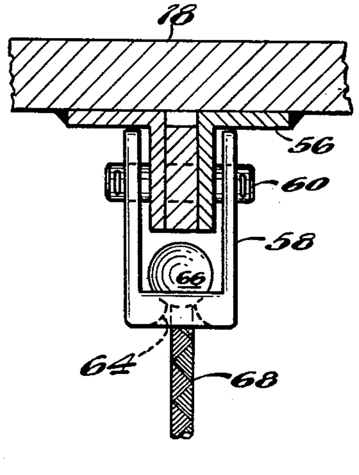
FIG. 7 is a cross sectional view taken along the line 7—7 of FIG. 6.
Figure 8:
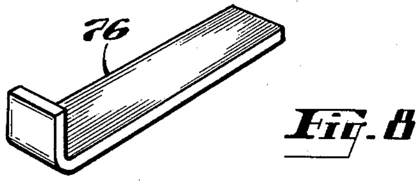
FIG. 8 is a view in perspective of an adjusting tool used with the device shown in FIG. 6.

In FIG. 6 we have illustrated a modification of the connector. In this instance in place of the solid rod of FIG. 4 we use a ball 66 swaged to a length of flexible, braided wire rope 68 which in turn is swaged to a post 70. The connection with the pad is made by way of angle pieces 56 welded to the pad and pierced by a pin 60 from which a yoke 58 is suspended. The wire rope 68 passes through a countersunk opening 64 and the ball 66 is seated in a ball socket formed in the yoke 58. The post 70 is connected to the spacer 22 in much the same fashion as is the rod 20 previously described. The base of the post is threaded to receive the ball and lock nut 48. A slot 74 is made across the end of the post to receive a tool 76 which holds the post against rotation when the nut 48 is tightened.

Another modification is shown in FIG. 9. Here a universal joint 78 is used to provide flexibility to the connector. A rod 80 permanently affixed to the joint 78 has the same arrangement of balled lock nut and socket mentioned in reference to other modifications. The head 82 of the joint is received in a well 86 of the traction pad and has shoulder 84 resting on the base of the well. The wrench 50 may be used to advantage here to hold the head 82 while the nut 48 is adjusted.

Figures 4, 5:
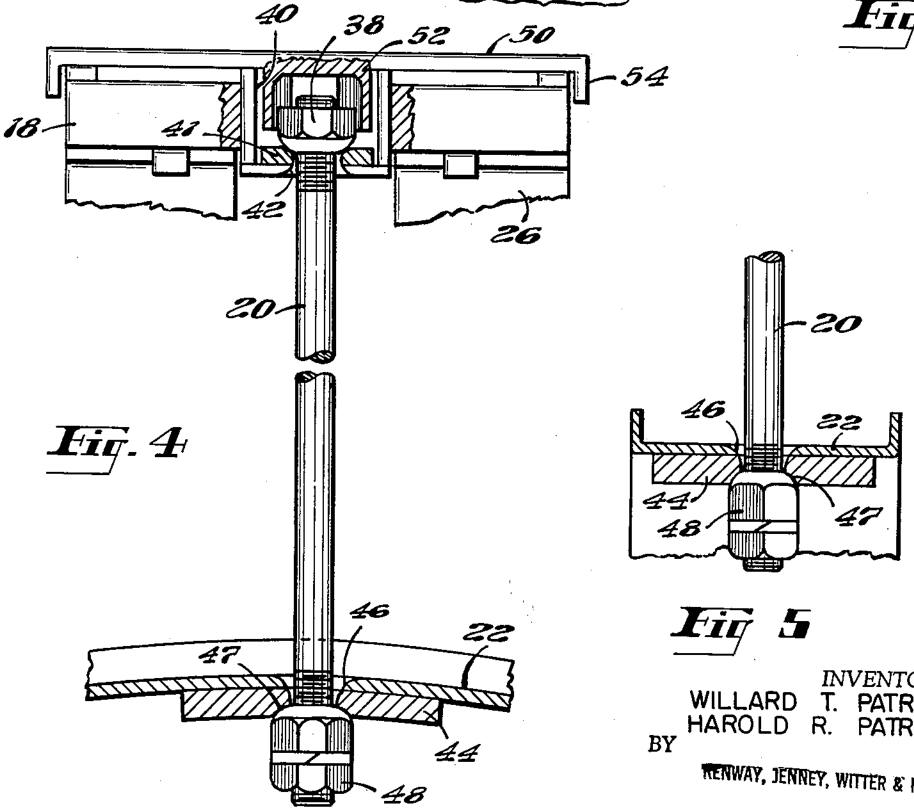
FIG. 4 is a view in side elevation partly in section of a traction pad and connector made according to our invention.
FIG. 5 is a view in end elevation partly in section of a portion of the device shown in FIG. 4.

FIG. 10 discloses the use of a flat-link pitch chain 96 flexibly connecting two threaded posts 90 and 92 which are mounted in the same manner as the rod 20 of FIG. 4. If desired a lock pin 94 may be passed through the nut 38 as is optional with any of the connections of this type.

In FIG. 11 we use a link chain 100 welded to a threaded post 98 and having a flat metal plate 102 suspended by a pin 104 between a pair of spaced supports 108 welded to the shoe 18. A cotter pin 106 may be used as a keeper for the pin 104.

In FIGS. 13–15 we show an adjustable hook type connection which is quick and easy to install. In this instance the shank of a hook 118 is received by a threaded nipple 120 and locked by a pin 122. Into the opposite end of the nipple 120 is screwed an expandable lock bolt 224, such as shown in detail in FIG. 26. The bolt head 128 rests on a ball bushing 130 which itself rests in a ball seat in the base of a well 132 formed in the traction pad 18. To allow the bolt 224 to swing the opening in the well is countersunk as at 134.

To anchor the hook 118 to the spacer 22 we provide in FIG. 13 a padeye 116 reinforced by a block 114 and welded to the spacer as shown. A trip rod 115 may be welded across the legs of the pad eye at the block 114 to disengage the hook and prevent injury to the device in the event that both tires should blow out simultaneously. It will be appreciated that should the hook be forced downward so as to strike the plate, the device may be damaged. By providing the trip rod 115 as shown herein, the hook, if forced down to its maximum downward position, will strike the trip bar and be deflected sufficiently thereby as to disengage the padeye.

As an alternative measure in FIGS. 14 and 15 we form an opening 144 in the spacer and pass the hook 118 through it. A stout pin 136 threaded at 138 and slotted at 140 is screwed into a pair of pin blocks or straps 142 to engage the hook. In both cases the effective length of the connection is controlled by adjusting the bolt 224.

Referring now to FIGS. 23–27 we have illustrated various types of expansion bolts which may be advantageously used in these connectors. The first one shown assembled in place in FIGS. 13 and 14 is illustrated more clearly in FIGS. 26 and 27. Here, the bolt 224 has an axial passage 226 of varying diameter to receive an inner bolt 228 threaded at its base. A number of slots 234, usually two, axially bisect the bolt 224 at 90° intervals. A skirted, annular wedge 230 is screwed to the extremity of the bolt 228. When the bolt 228 is turned the wedge runs up the bolt 228, through the passage 226, thereby spreading apart the slotted segments. To keep the wedge 230 from turning with the inner bolt when it is tightened, an ear 232 is formed on the wedge and moves up and down within one of the slots 234.

FIGS. 23 and 24 illustrate two additional expansion bolts for use with connectors. The one shown in FIG. 24 utilizes an outer bolt 204 having a central axial passage 206. The upper portion of the passage is tapped to receive a threaded head 212 of an inner bolt 210, while the lower portion of the passage narrows to define a cone seat 211. The bottom portion of the bolt 204 is bisected by axial slots 218 at 90° intervals defining segments 220 as seen best in FIG. 25. The bolt 210 is pointed at its tip and by screwing the bolt 210 into the passage the segments 220 are spread to lock the bolt 204 in the desired position. The head 212 is slotted at 214 for the insertion of a screw driver for turning the bolt.

In FIG. 23 we show an expandable bolt similar to that of FIG. 24 but in this instance we have flattened the end of the inner bolt 210 and provide a bearing ball 216. The use of this bearing ball in place of the point reduces the turning friction considerably and makes it much easier to expand the segments when locking the bolt.

Coming now to FIGS. 16–22 we have a series of connecting devices featuring eye links arranged in several different manners but all displaying the flexible characteristics featured by this invention.

In FIG. 16 an eye link 146 is fastened to a rod 148 which is inserted in a cylindrical tube 150. The tube is provided with an elongated opening 152 to receive a cross pin 154 extending from the rod 148. The rod is free to reciprocate within the tube 150 to the extent of the length of the opening 152. The eye link 146 is rather large for added flexibility and is joined to the spacer 22 in the same fashion as is the hook shown in FIG. 14.

FIG. 17 illustrates the eye 146 and rod 148 fitted with a piston 156 for reciprocation within a chamber 158 of a cylindrical union 160. This modification provides a damping effect to reduce the strain on the working parts due to sudden shocks. The upper neck of the cylinder houses a tapped bushing 161 to receive a bolt for coupling the cylinder with a traction pad.

Thus far we have described our invention and its modifications generally with reference to spoke duel wheel assemblies although many of the connectors are adaptable for use with the disk type wheel mentioned above. Since both types of wheels are in common use we shall describe several connection arrangements which may be used for attached traction pads to this sort of wheel.

In FIG. 39 there appears a cross-section of a disk type dual wheel assembly with the traction pad 18 secured transversely in place across the tire treads. In this instance we provide as an anchoring means for the connection an annular plate 284 bolted between two disk wheels 262. Spaced about its periphery the plate 284 is provided with a number of eyes 286 for engaging a hook 288 of a connector. The connector here comprises a nipple 292 to which the hook is threaded and locked, as by a pin 290. A bolt 294 is screwed into the opposite end of the nipple and has its head seated on a bushing 130 disposed in a well 132 fashioned in the pad 18.

To reduce any vibration which might cause the bolt 294 to loosen, an insert of nylon 296 is deposited in an opening in the wall of the nipple 292 as appears in greater detail in FIGS. 28 and 29. If desired, the nylon may be held in place by tapping the opening and engaging a set screw (not shown). As an alternative measure the nylon may be placed in the body of the bolt (FIG. 30) rather than in the nipple. In either case the nylon should contact both the bolt and the nipple to be effective as a vibration absorbent. Another arrangement for locking the connection at the proper length is to provide jam nuts on the studs or bolts used and tightening them against the nipple when the connector has been adjusted.

It will be noticed in FIGS. 28 and 29 as well as in other connectors in which a bolt is screwed into a nipple that a cut is made across the top of the nipple as at 291 in FIG. 29 or as at 202 in FIG. 21. This cut serves as a thread cleaner for the bolt, for we have found that by simply cutting away a section of the nipple top the edge of the side of the cut acts as a cutting tool when the bolt is being screwed into place. The size of the cut is not critical and up to 180° may be removed from the nipple without innpairing this effect. Since the parts of these traction pads will be frequently exposed to dirt and weather, it is important that some means of removing rust and sediment be available. The connection we have provided is self cleaning besides being simple and inexpensive to manufacture.

Referring now to FIG. 41 there is illustrated an exploded view of a disk wheel assembly in which we have substituted an annular band 306 in place of the plate 284 of FIG. 39. The band 306 is similar in appearance to the spacer 22 used in connection with the spoke wheels but serves only to anchor the traction pad to the connections. It will be seen that each disk wheel element 262 has a number of openings 264 spaced from one another in a circle, and tire rims 266 mounted about the wheel peripheries. The band 306 is provided with a set of ears 310 and assembled so that it is snugged up against the wheels and under the rims. The ears 310 protrude through opposite openings 264 in each wheel to lock the band in place and prevent it from spinning about the wheel.

A number of padeyes 308 may be welded to the band 306 for use with the hook type connectors or with a socket 280 as shown in FIG. 40 for use with the rod connector 20 described and shown previously in FIG. 4. The socket here receives the inner end of the rod 20 with its ball and lock nut 48. The opening 282 is countersunk to allow for freedom of motion. A lock pin 304 may be inserted in the nut 38 if desired.

It is usually desirable that the spacers 22, plates 284 and bands 306 that we have described be installed on wheels permanently to facilitate mounting of the traction pads when they are needed, for if the spacer, band, or plate has been previously assembled a full set of traction pads may be easily added in the matter of a few minutes. Obviously, it is not always necessary that a full set always be put on for the number required will vary according to conditions, often times a single pad being sufficient.

Should it prove undesirable for some reason to permanently install a plate 284 or a band 306 in disk wheels, we have developed individual anchoring pieces that may be taken on and off with the traction pads. A typical anchoring piece is shown in FIG. 42 and comprises a base plate 268 having ears 314 and a padeye 276 welded thereto. The plate is held between the wheels, spanning the rims, with the ears 314 extending into the wheel openings 264. The traction shoe and connector are engaged with the padeye and tightened together. A bracket or table 270 may be used to support the plate 268 and to discourage its falling out during assembling. The table is shown in FIGS. 36 and 37 as having a pair of depending legs 272, each having pronged feet 275 for straddling the wheels 262 through their openings 264.

This padeye is, of course, used with hook connectors, however, when a rod is used the socket 280 described in reference to FIG. 40 and shown individually in FIG. 38, may be welded to an apertured plate 278.

Some typical connecting arrangements are illustrated in FIGS. 18–22 and 43–44. In FIG. 18 an eye 168 is welded to a bushing 166 and passes through an opening in a plate 162. Straps 164 depend from the plate and a pin 170 is inserted through the straps and bushing to pivotally connect the members.

FIGS. 19 and 20 are two different views of another type of connection for individual traction shoe devices and which is particularly useful in situations where there is limited space available between the wheels. In this type a base plate 172 reinforced by a block 178 is formed with a pair of ears 174 and a central aperture 176 formed between two bolt holes. A U-bolt 180 is maneuvered through the bolt holes and an eye 184 of the connector. The connection is completed by the nuts 182. For fastening the traction pad to the connector, the top of the connector has a tapped hole 188 to receive a bolt such as has been described herein. The top is also cut as at 190 for thread cleaning purposes as already mentioned.

In FIGS. 21 and 22 we have illustrated the eye type connector already described in FIG. 16 but here attached to a plate 192 by a shackle 196 having each leg bent into a prong 198. The plate 192 has a central opening 194 of the contour shown in FIG. 22. The connection is made by passing the eye 146 through the opening 194, slipping the shackle 196 through the eye and pulling both back through the opening. The top of the connector 150 is cut at 202 and threaded at 200 to receive a bolt for fastening the traction pad.

FIGS. 43 and 44 show the hook 288 attached to a plate 316 by passing through a hole 318 and engaging a pin 322. The pin is secured to the plate by means of straps 320.

This concludes the description of the connecting members used in the invention and we will now examine in detail the guides 26 briefly mentioned previously. The guides shown in FIGS. 31–34 are fastened to the traction pad by nuts and bolts 254 engaging with angle supports 248 welded to the pad. The guides are preferably of steel and include a pair of separable plates 250 sandwiched together. Extending from each of these plates is a shield 253 having its lower margin turned inward and welded to the lower margin of the plate. An additional brace 252 is provided near the upper margin of the shield.

Since the guide should be in contact with both tires to prevent unnecessary movement of the pad it is desirable that the guides be adjustable according to the amount of space between the tires. Different manufacturers produce dual wheels with variations in space and similarly tires or different size will also vary the space between sidewalls. To compensate for these factors we provide a guide that is adjustable to fit whatever set of tires on which it may be used.

FIG. 32 shows a guide set at minimum width, while FIG. 34 shows the guide in extended position. To achieve the extension the plates 250 are bolted over the outside faces of the supports 248 and a pair of spacers 258 are inserted between the supports. One or two struts 260 are then added to strengthen the guide. For intermediate sizes we fashion the guides as shown in FIG. 33. Here the shield 253 and braces 252 are applied to a plate 255 which in turn is mounted to a spacer 256 bolted between the supports. By combining these elements in different ways as suggested by these three examples the guides may be set for any set of tires. Should it become necessary to increase traction or to provide additional restraint against skewing, the shoe may be enlarged as suggested in FIG. 39, and supplementary guide segments 261 may be fastened to either or both extremities of the shoe. The shields of these segments face inwardly to engage the outer walls of the tires and firmly orient the shoe with respect to the tires.

The traction devices that we have provided by this invention offer many advantages over those presently available. For instance, the shoe is free to pivot about its radial connecting member at a point adjacent the shoe. This feature compensates for all normal flexing of the tires. Also the connecting member is pivotally engaged with its anchoring piece, no matter which anchoring arrangement is used. In cases where a rigid connecting member is used we have provided means for either the shoe to ride radially in and out along the member, or the member to move likewise in reference to the anchoring members. Or in some cases both motions are allowed.

By this combination of movements we have achieved a full-floating action for the traction shoe so that it will stay in position against the tire tread despite even the most vigorous of tire motions.

In addition, this feature facilitates installation of the devices. For instance, when engaging a hook type connector, the shoe and connector may be moved angularly about the tire to the extent necessary.

The radial adjusting features of the invention are both quick and positive. The length and tension of the connectors may be easily set without disconnecting the shoe.

While we have described in detail a number of modifications of our invention we are aware that many elements may be combined in a manner different from that shown and other modifications will appear to those skilled in the art and may be made without departing from the scope of our invention.

Having thus disclosed our invention and described in detail preferred embodiments thereof we claim and desire to secure by Letters Patent:

1. Traction means for a dual tire wheel assembly including anchoring means mounted between the wheels of said assembly, at least one traction shoe disposed transversely across tires mounted on said wheels, a connecting member radially disposed between said tires for joining said shoe to said anchoring means, said connecting member permitting radial movement of said shoe as well as angular deflection thereof, and guide elements coupled to said shoe for orienting said shoe relative to said tire, said guide elements being adjustable according to the space between facing side walls of said tires.

2. Traction means for a dual tire wheel assembly including anchoring means mounted between the wheels of said assembly, at least one traction shoe disposed transversely across tires mounted on said wheels, connecting means disposed along a radius between said tires to connect said traction shoe to said anchoring means, said connecting means being adapted to hold said shoe against said tire and to permit said shoe to pivot about a point along said radius, and guide elements coupled to said shoe for orienting said shoe relative to said tire, said guide elements being adjustable according to the space between facing side walls of said tires.

3. Traction means for a dual tire wheel assembly including anchoring means mounted between the wheels of said assembly, at least one traction shoe disposed transversely across tires mounted on said wheels, a connecting member radially disposed between said tires for joining said shoe to said anchoring means, said connecting member pivotally and flexingly engaging said shoe and said anchoring means to permit radial movement of said shoe as well as angular deflection thereof, and guide elements coupled to said shoe for orienting said shoe relative to said tires.

4. Traction means for a dual tire wheel assembly including anchoring means mounted between the wheels of said assembly, at least one traction shoe disposed transversely across tires mounted on said wheels, an adjustable connecting member radially disposed between said tires for joining said shoe to said anchoring means, said connecting member permitting radial movement of said shoe as well as angular deflection thereof, and guide elements coupled to said shoe for orienting said shoe relative to said tires, said guide elements being adjustable according to the space between facing side walls of said tires.

5. Traction means for a dual tire disc wheel assembly including an annular plate mounted between wheels of said assembly, at least one traction shoe disposed transversely across tires mounted on said wheels, an adjustable connecting member radially disposed between said tires for joining said shoe to said plate, said connecting member pivotally and flexingly engaging said shoe and said annular plate to permit said shoe to move radially in and out with said tire and to deflect angularly in response to uneven deformation of said tires, and guide elements coupled to said shoe for orienting said shoe relative to said tires.

6. Traction means for a dual tire spoke wheel assembly including a spoke wheel, rims mounted on said wheel, tires mounted on said rims, an annular spacer mounted between said rims, at least one traction shoe disposed transversely across said tires, at least one adjustable connecting member radially disposed between said tires for joining said shoe to said spacer, said connecting member flexingly engaging said shoe and said spacer to permit said shoe to move radially in and out with said tires and to deflect angularly in response to uneven deformation of said tires, and guide elements depending from said shoe for orienting said shoe relative to said tires.

7. Traction means for a dual tire wheel assembly including anchoring means mounted between wheels of said assembly, tires mounted on said wheels, said anchoring means provided with at least one countersunk opening, at least one traction shoe disposed transversely across said tires, a countersunk opening formed in said shoe, a rod provided with threads at both ends, said rod passing through an opening in said anchoring means and the opening in said shoe, ball seats formed in said shoe and said anchoring means, balled nuts engaging said rod and received in said ball seats, said ball seats and said balled nuts thereby permitting said traction shoe to deflect angularly and move in and out along said rod in response to the movement of said tires.

8. Traction means for a dual tire wheel assembly including an annular band mounted concentrically between wheels of said assembly, tires mounted on said wheels, said annular band provided with at least one radially extending pad eye secured to the outer surface thereof, at least one traction shoe disposed transversely across said tires, a connecting member provided at one end with a swivel joint for connection with said traction shoe and provided at the other end with a hook for engagement with said pad eye, said connecting member further provided with means for adjusting the effective length of said member.

9. Traction means for a dual tire wheel assembly including anchoring means mounted between wheels of said assembly, tires mounted on said wheels, said anchoring means provided with at least one countersunk opening and a ball seat formed therein, at least one traction shoe disposed transversely across said tires, a connecting member including a length of braided wire rope having a ball secured to one end and a post secured to the other end, said ball received in a swivel device connected to said shoe, said post passing through the opening in said anchoring means and provided with a threaded end portion to receive a balled nut, said post being slotted at its end to receive a tool to hold said post against rotation while said nut is being turned.

10. Traction means for a dual tire wheel assembly including anchoring means mounted between wheels of said assembly, tires mounted on said wheels, said anchoring means provided with at least one countersunk opening and a ball seat formed therein, at least one traction shoe disposed transversely across said tire, a recessed opening formed in said shoe, a universal joint received by said opening, a rod secured to said joint and extending radially between said tires through the opening in said anchoring means, said rod being threaded at the end portion to receive a balled nut thereby connecting said shoe to said anchoring means and permitting said shoe to deflect angularly and move radially in and out in response to the movement of said tires.

11. Traction means for a dual tire wheel assembly including anchoring means mounted between wheels of said assembly, tires mounted on said wheels, at least one shoe mounted transversely across said tires, a connecting member radially disposed between said tires for connecting said shoe to said anchoring means, said member including a post and several chain links, said post engaging said anchoring means and the chain link portion engaging said shoe.

12. Traction means for a dual tire wheel assembly including anchoring means mounted between wheels of said assembly, tires mounted on said wheels, at least one traction shoe disposed transversely across said tires, a union radially disposed between said tires for securing said shoe to said anchoring means, a recessed and countersunk opening formed in said shoe to receive one end of said union, said union provided at one end with a hook for engagement with said anchoring means, the opposite end of said union being tapped to receive a bolt engaging with said traction shoe.

13. Traction means for a dual tire wheel assembly including a bolt formed with a central axial passage and a number of cross cuts bisecting its lower portion to form a plurality of radial segments, said passage decreasing in diameter towards the lower portion, annular shoulders formed in the lower portion of said passage to receive a bearing-ball, an inner bolt axially disposed within said passage and in contact with said bearing-ball, said inner bolt being in thread engagement with said passage whereby said inner bolt may be rotated to press against said ball and radially expand said segments and lock said bolt in position.

14. Traction means for a dual tire wheel assembly according to claim 12 wherein said union is formed with a radial opening, a nylon insert received in said opening and bearing against said bolt to hold said bolt in vibrationless engagement with said union.

15. Traction means for a dual tire wheel assembly according to claim 12 wherein the upper end of said union is formed with a slot effective to clean the threads of said bolt upon insertion of said bolt in said union.

16. Traction means for a dual tire wheel assembly according to claim 12 wherein a nylon insert is provided in the shank of said bolt to bear against said union thereby holding said bolt in vibrationless engagement with said union.

17. Traction means for a dual tire wheel assembly including anchoring means mounted between wheels of said assembly, tires mounted on said wheels, at least one traction shoe disposed transversely across said tire, an opening formed in said anchoring means, at least one connecting member radially disposed between said tires for connecting said shoe to said anchoring means, said connecting means including a union being tapped at one end to receive a bolt and at the other end provided with an eye for engagement with said anchoring means, said shoe formed with a recessed and countersunk opening to receive the head of said bolt, said eye being provided with a rod received in a chamber formed axially in said union and mounted for reciprocation therein.

18. A device for connecting a traction pad to a dual tire wheel wheel assembly, including a length of braided wire rope, a metal ball secured to one end of said wire rope, and a threaded post secured to the opposite end of said wire rope.

19. A device for connecting a traction pad to a dual tire wheel assembly, including a rod, an eye connected to one end of said rod, the opposite end of said rod extending into a cylinder, a piston formed on said opposite end for reciprocation in said cylinder, said cylinder provided at one end with a collar to engage said rod and at the other end with a tapped bushing.

20. Apparatus for connecting a traction pad to a dual tire wheel assembly including a tapped union, a lockable bolt engaging one end of said union and adapted to engage with said pad, and a hook engaging the opposite end of said union, and anchoring means mounted between the tires of said assembly and adapted to engage with said hook.

21. Apparatus according to claim 20 wherein said anchoring means includes a pad-eye for engagement with said hook and a tripping rod disposed transversely between the legs of said pad-eye to disengage said hook from said pad-eye when said hook strikes said tripping rod.

22. A device for connecting a traction pad to a dual tire wheel assembly, including a rod provided with a tapped axial hole at one end and an eye at the other end, a U bolt, a generally flat rectangular plate having a central elongated opening formed therein to receive said eye, a pair of spaced openings formed adjacent said elongated opening to receive the legs of said U bolt, said U bolt being threaded at both ends to receive a pair of nuts and adapted to pass through said spaced openings and said eye to engage said eye to said plate.

23. A device for connecting a traction pad to a dual tire wheel assembly, including a generally flat rectangular plate, a pair of journals depending from opposite margins of said plate, an elongated opening formed in said plate between said journals, a bushing provided with an eye extending perpendicularly thereof, and arranged to protrude through said opening, and a pin passing through said journals and said bushing to engage said eye with said plate.

24. A device for connecting a traction pad to a dual tire wheel assembly including a cylindrical member provided at one end with a tapped axial opening, a diametrical groove formed across said opening, an axial chamber extending through the remaining portion of said member, elongated openings formed lengthwise on said member and communicating with said chamber, an eye provided with a rod, said rod received in said chamber for reciprocation therein, a pin extending perpendicularly through said rod and received in said elongated openings to limit the reciprocation of said rod, a generally flat rectangular plate provided with a central opening to receive a shackle for engaging said member and said eye to said plate.

25. A traction device for dual tire wheel assemblies, including a traction shoe disposed transversely across said tires, guide elements connected to said shoe and extending between said tires to contact opposite facing sidewalls and orient said shoe relative to said tires, said guide elements being formed in separable sections whereby said elements may be adjusted according to variations in space between said sidewalls.

26. In a dual tire disc wheel assembly wherein said wheel is provided with a number of oppositely aligned openings formed concentrically about said wheel, an anchoring member for engagement with a traction device, said member provided with a plate extending between said openings and engaging with said assembly, said plate supporting a pad-eye extending outwardly between the wheels of said assembly, and a bracket depending from said plate and engaging said openings to support said plate.

References Cited in the file of this patent

UNITED STATES PATENTS

| | | |
|---|---|---|
| 1,977,764 | Jersey et al. | Oct. 23, 1934 |
| 2,312,486 | Riesen | Mar. 2, 1943 |
| 2,420,361 | Dennison | May 13, 1947 |
| 2,454,005 | Pletch | Nov. 16, 1948 |
| 2,473,782 | Boone | June 21, 1949 |
| 2,652,091 | Kane | Sept. 15, 1953 |
| 2,858,871 | Kinnucan | Nov. 4, 1958 |